Figure 1:
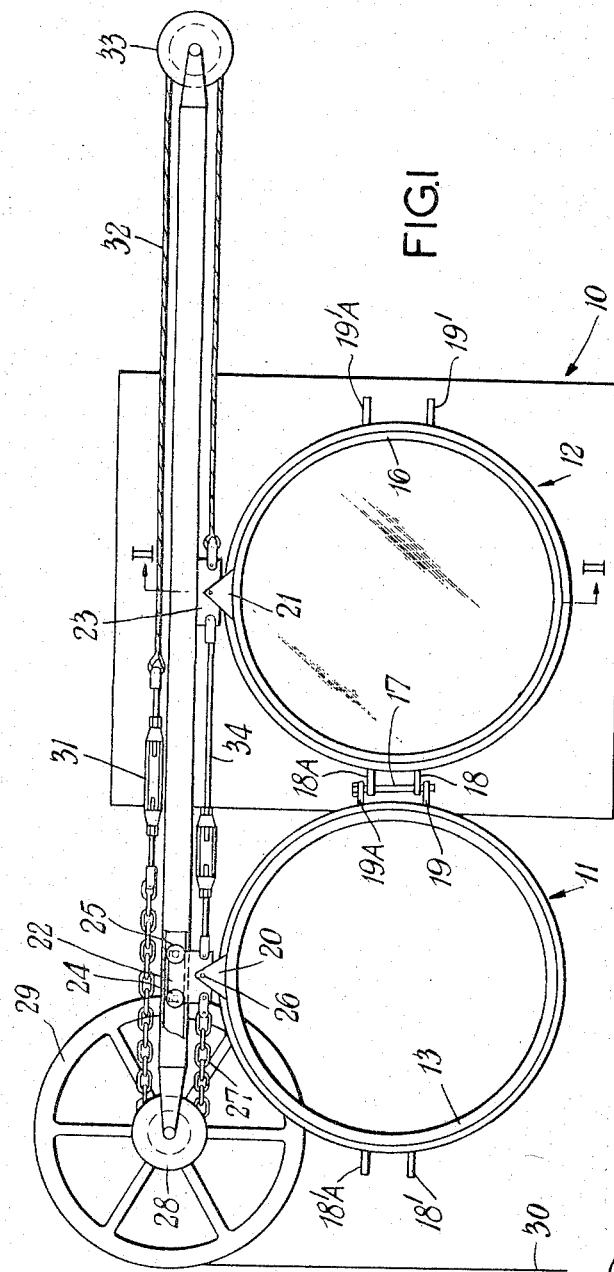

Aug. 22, 1967

A. RIDOUT 3,336,949

GOGGLE VALVE AND THE LIKE

Filed Oct. 16, 1964

2 Sheets-Sheet 1

Inventor
Alan Ridout
by Fraser & Fraser
attorneys

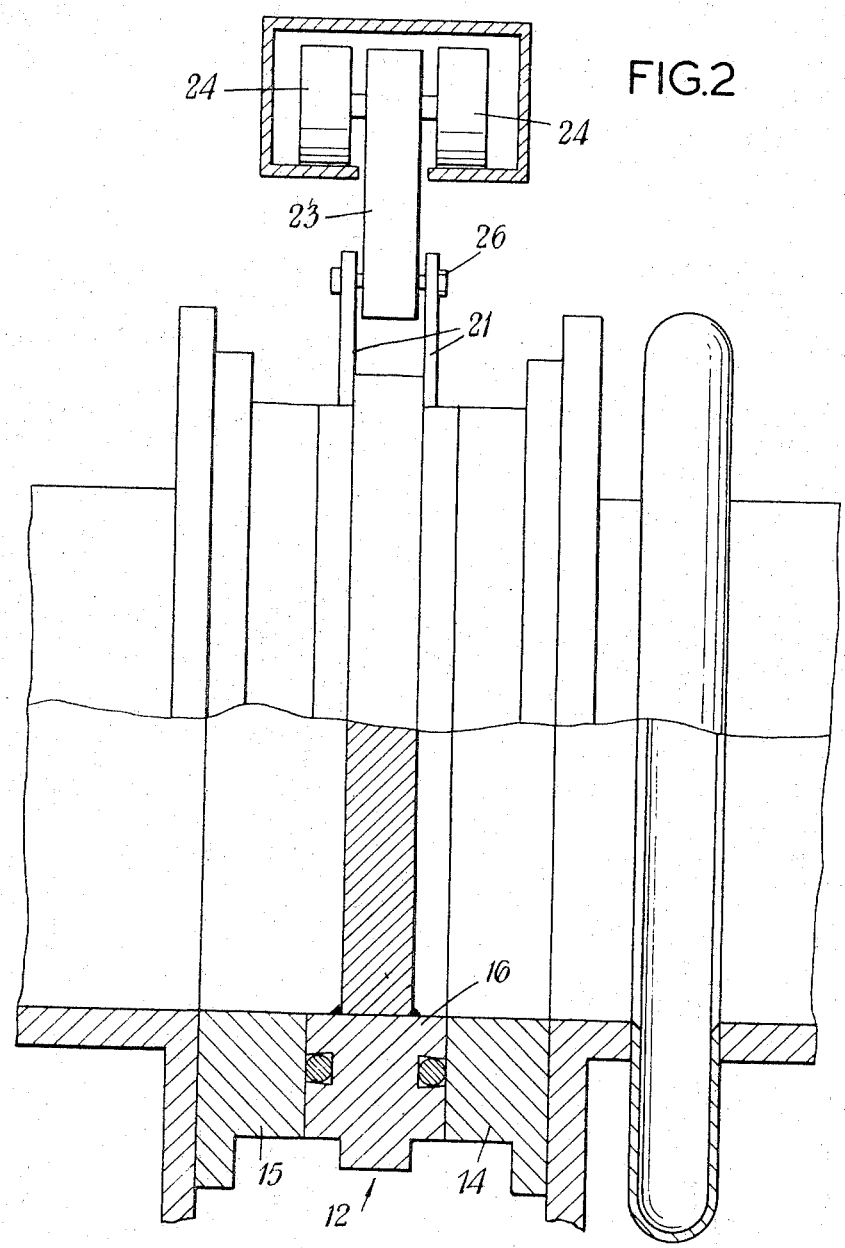

United States Patent Office 3,336,949
Patented Aug. 22, 1967

3,336,949
GOGGLE VALVE AND THE LIKE
Alan Ridout, Hounslow, England, assignor to John Miles & Partners (London) Limited, Surrey, England, a British company
Filed Oct. 16, 1964, Ser. No. 404,243
Claims priority, application Great Britain, Jan. 29, 1964, 3,843/64
2 Claims. (Cl. 138—94.3)

The present invention relates to improvements in goggle valves and the like. More particularly it relates to an improved method of removing valve seating rings for rapid replacement.

In a well known goggle valve the goggle plate seating rings are attached to a metal frame and although in some instances it may be possible to remove the seating rings from the frame this is a difficult and slow procedure, with a consequent loss of production whilst the main is inoperative.

According to the invention there is provided a suspended ring valve for controlling the flow of fluid through two pipes, the adjacent ends of which pipes are spaced longitudinally and each of which ends is provided with a valve seat, comprising two connected rings corresponding in shape with those of the seats, one only of which rings encloses an obturator, means for moving the rings transversely of the pipes to positions in which each may be clamped between the seats, the two rings being detachably connected one to the other and to the said moving means so that either ring alone may be replaced without putting the valve out of operation.

A preferred form of the invention will now be described with reference to the accompanying diagrammatic drawings in which:

FIGURE 1 is a front sectional view of a gas main and a suspended ring valve incorporated therein, FIGURE 2 is a side sectional view taken along the line II—II of FIGURE 1.

As can be seen in FIGURE 1, the valve 10 contains sealing means consisting of two rings 11 and 12. The ring 11 corresponds to the open position of the valve, and consists of a circular seating ring 13 which when in position in the gas main is clamped between the two valve seats 14 and 15 (see FIGURE 2). The valve seat 14 may be moved, in any known or suitable manner, to unclamp the valve.

The centre of the seating ring 13 is open, and thus when it is clamped between the valve seats 14 and 15 it serves to prevent the leakage of gas out of the main, but offers no resistance to its longitudinal flow along the main.

The ring 12 corresponds to the closed position of the valve, and consists of a seating ring 16 of exactly the same dimensions as the seating ring 13, but the centre of the ring is an obturator in the form of an imperforate metal plate, and when the seating ring 16 is clamped between the valve seats 14 and 15 the gas main is completely sealed off.

The two rings 11 and 12 are detachably connected together by a removable link pin 17 which passes through the links 18 and 18a on part 12 and links 19 and 19a on part 11. Links 18′ and 18′A on ring 11 and links 19′ and 19′A on ring 12 are provided, as shown in FIGURE 1, so as to make the rings fully interchangeable, as will be described later.

In order that the two parts of the valve may be moved into and out of their operative position they are detachably secured, by means of brackets 20 and 21 respectively, to supporting runners.

The supporting runner for ring 11 comprises a supporting block 22 to which are attached two pairs of supporting wheels 24 and 25.

The supporting runner is contained in a boxed-in runway with an open slot in the bottom through which the supporting block 22 passes, the lower inside face of the runway serving as a track on which the wheels 24 and 25 can run.

The ring 11 is attached to the lower half of the supporting block 22 by means of a removable suspension pin 26.

An exactly similar arrangement is used to support the ring 12.

To the lower left hand side (in FIGURE 1) of the supporting block 22 is attached one end of a driving chain 27, which passes over a pocketed sheave 28 coaxially mounted on a larger diameter chain wheel 29 driven by a hand chain 30. This mechanism may be power driven if required. At its other end the driving chain 27 is attached, via an adjustable turn buckle 31, to a cable 32 which passes over a pulley wheel 33 and is attached to the right hand side (in FIGURE 1) of the supporting block 23 for the part 12.

The two supporting runners 22 and 23 are interconnected by an adjustable tie rod 34. Thus operation of the hand chain and wheel causes the valve to slide from its "closed" to its "open" position or vice-versa.

If it be desired to repair or replace the seating ring 13 on ring 11, the ring 12 is slid into position in the main and clamped between the valve seats 14 and 15. The link pin 17 and the suspension pin 26 are both removed, whereupon the whole of ring 11 can be removed.

The link pin 17 and the suspension pin 26 are replaced when the new or repaired ring 11 is in position. This whole operation takes only a comparatively short time instead of the hours needed with the conventional type of goggle valve. An exactly similar operation may be performed when removing ring 12.

Should the valve develop a bad leakage when in the open position, the ring 12 can be removed and replaced by a new open ring 11 using links 18′ and 18′A which will mate with the links 19 and 19A on the original ring 11. The valve is unclamped and the new ring 11 is slid into position and the valve re-clamped. The original, leaking ring 11 is then removed and replaced by the original ring 12. This of course means that the open and closed positions of the valve are interchanged but the time for which the main is inoperative during the changeover is greatly reduced.

The valve just described may be used to shut off a gas main, or alternatively if any known or suitable means for cooling the valve is included, it may be used as a hot blast stove burner valve.

What I claim is:

1. A suspended ring valve for controlling the flow of fluid through two pipes whose adjacent ends are spaced longitudinally, said ring valve comprising
   a ring-shaped valve seat on the end of each of said pipes;
   two valve rings, each corresponding in shape to said valve seat;

means for releasably pivoting or hinging said valve rings together;

an imperforate plate in only one of said rings;

transfer means for shifting said connected valve rings horizontally and transversely of said pipes into positions in which each may be selectively clamped between said seats, said transfer means being disposed above said pipes;

and means for releasably suspended said valve rings individually from said transfer means;

whereby said rings are unconstrained except at three spaced points, two points lying above the respective centers of the rings and a point lying on a line joining the centers of the rings.

2. A valve as claimed in claim 1 in which the rings are interchangeable one with the other.

References Cited
UNITED STATES PATENTS

| | | | |
|---|---|---|---|
| 2,050,544 | 8/1936 | Robinson et al. | 138—44 |
| 3,171,442 | 3/1965 | Carr | 138—94.5 |

LAVERNE D. GEIGER, *Primary Examiner.*

T. L. MOORHEAD, *Assistant Examiner.*